(12) United States Patent
Potts et al.

(10) Patent No.: US 8,787,651 B2
(45) Date of Patent: Jul. 22, 2014

(54) METHODS FOR FEATURE ANALYSIS ON CONSECUTIVE TISSUE SECTIONS

(75) Inventors: Steven Potts, Flagstaff, AZ (US); Trevor Johnson, San Marcos, CA (US); Frank Voelker, Brewster, MA (US); George David Young, Boulder, CO (US)

(73) Assignee: Flagship Biosciences, LLC, Boulder, CO (US)

( * ) Notice: Subject to any disclaimer, the term of this patent is extended or adjusted under 35 U.S.C. 154(b) by 208 days.

(21) Appl. No.: 13/247,991

(22) Filed: Sep. 28, 2011

(65) Prior Publication Data
US 2012/0076390 A1    Mar. 29, 2012

Related U.S. Application Data

(60) Provisional application No. 61/387,298, filed on Sep. 28, 2010, provisional application No. 61/434,428, filed on Jan. 19, 2011, provisional application No. 61/446,942, filed on Feb. 25, 2011.

(51) Int. Cl.
*G06K 9/00* (2006.01)

(52) U.S. Cl.
USPC ........... 382/133; 382/128; 382/181; 382/190; 382/276; 382/294; 435/40.5; 435/40.51; 435/40.52

(58) Field of Classification Search
None
See application file for complete search history.

(56) References Cited

U.S. PATENT DOCUMENTS

| | | | |
|---|---|---|---|
| 2003/0012420 A1* | 1/2003 | Verwoerd et al. | 382/133 |
| 2003/0215936 A1* | 11/2003 | Kallioniemi et al. | 435/287.1 |
| 2004/0085443 A1* | 5/2004 | Kallioniemi et al. | 348/135 |
| 2005/0030372 A1* | 2/2005 | Jung et al. | 348/77 |
| 2006/0280352 A1* | 12/2006 | Muschler et al. | 382/133 |
| 2009/0074282 A1* | 3/2009 | Pinard et al. | 382/133 |
| 2009/0245610 A1* | 10/2009 | Can et al. | 382/133 |
| 2010/0093023 A1* | 4/2010 | Gustafsson et al. | 435/40.52 |
| 2010/0215227 A1* | 8/2010 | Grunkin et al. | 382/128 |
| 2010/0290692 A1* | 11/2010 | Macaulay et al. | 382/133 |
| 2011/0216954 A1* | 9/2011 | Sundar et al. | 382/131 |
| 2011/0274338 A1* | 11/2011 | Park et al. | 382/133 |
| 2012/0288177 A1* | 11/2012 | Wang et al. | 382/131 |
| 2012/0294537 A1* | 11/2012 | Wallace et al. | 382/201 |

FOREIGN PATENT DOCUMENTS

WO    WO 2008/080403    7/2008

* cited by examiner

*Primary Examiner* — Matthew Bella
*Assistant Examiner* — Jason Heidemann
(74) *Attorney, Agent, or Firm* — Coastal Patent Law Group, P.C.; Joshua S. Schoonover

(57) ABSTRACT

Feature analysis on consecutive tissue sections (FACTS) includes obtaining a plurality of consecutive tissue sections from a tissue sample, staining the sections with at least one biomarker, obtaining a digital image thereof, and identifying one or more regions of interest within a middle of the consecutive tissue sections. The digital images of the consecutive tissue sections are registered for alignment and the one or more regions of interest are transferred from the image of the middle section to the images of the adjacent sections. Each image of the consecutive tissue sections is then analyzed and scored as appropriate. Using FACTS methods, pathologist time for annotation is reduced to a single slide. Optionally, multiple middle sections may be annotated for regions of interest and transferred accordingly.

13 Claims, 3 Drawing Sheets

Process for Feature Analysis on Consecutive Tissue Sections (FACTS)

Multiplexing of IHC or related biomarker measurements after FACTS

METHODS FOR FEATURE ANALYSIS ON CONSECUTIVE TISSUE SECTIONS

CROSS-REFERENCE TO RELATED APPLICATIONS

This application claims priority to U.S. Provisional Ser. No. 61/387,298, filed Sep. 28, 2010; U.S. Provisional Ser. No. 61/434,428, filed Jan. 19, 2011; and U.S. Provisional Ser. No. 61/446,942, filed Feb. 25, 2011; the entire contents of which are hereby incorporated by reference.

BACKGROUND OF THE INVENTION

1. Field of the Invention

This invention relates to methods for analysis of biological tissue sections; and more particularly to improved methods for quantitative pathology analysis across multiple consecutive tissue sections for a variety of applications.

2. Related Art

Quantitative pathology analysis includes a variety of known techniques for analysis of biological samples for the purposes of diagnosis and quantification of the presence of one or more diseases within a tissue specimen. For example, a pathologist might analyze a tissue sample to diagnose the presence of a cancer or other disease, or the pathologist might quantify the amount of disease present in a particular sample to determine a therapeutic dosage appropriate for treatment of the particular disease. The field of pathology was recently revolutionized with the emergence of digital imaging equipment. Prior to digital imaging, biological samples were viewed and analyzed under a microscope, and quantification of diseases was largely estimated by an experienced practitioner. Modernly, however, digital imaging equipment and related techniques are providing pathologists with tools for faster digital pathology analysis with improved accuracy in quantification methods.

With the ability to rapidly scan an entire tissue section on a glass microscope slide, pathologists are able to view and make critical histopathological determinations and/or diagnoses from a digital image rather than viewing under a microscope. A whole slide digital image also allows a pathologist to run quantitative image analysis across an entire tissue section or a designated region of interest (ROI) subset of the whole tissue section. However, this requires first either manually drawing digital regions of interest or running tissue analysis algorithms to determine the appropriate tissue locations where an image analysis routine should be run. This step is tedious and error-prone, whether it is done manually or with the use of a computer. And with each slide this process has to be repeated, further adding to increased error probability.

Immunohistochemistry (IHC) is a well established approach for observing protein or gene expression in tissue. It relies on a chromogen color change coupled to an antibody binding event. The pathologist scores IHC slides by selecting appropriate tissue areas on a glass slide under a microscope, or a computer monitor with a whole slide digital image, and then calculates a score. It has been well documented that the computer has higher precision than a pathologist at reproducibly quantifying colorimetric changes (Lange H, USCAP 2008, Consistent IHC HER2 Image Analysis on ScanScope Systems, Poster 006). This precision advantage unfortunately is handicapped by the extreme difficulty that the computer has in intelligently deciding on which region of a slide to make this colorimetric measurement. Many leading digital pathology software vendors are working on improved tissue analysis techniques, including but not limited to Visiopharm, Definiens, CRI, Bioimagene, and Aperio. A typical workflow involves a pathologist painting or outlining example specimens on one or more slides of each tissue type, and then the computer learns from these examples to create a solution that can be applied across an entire slide, identifying the tissue types outlined by the pathologists. This approach may work relatively well on a single slide, or sometimes can perform satisfactorily across many slides in a study where the histology and samples have been handled uniformly.

In practice, especially in oncology clinical trials, samples are collected under non-uniform conditions and with many uncontrolled variables of sample collection, fixation, and even immunohistochemistry processing. This makes the ability to run tissue analysis across non-uniform samples extremely difficult. A pathologist must either manually annotate regions of interest on every slide, or train tissue analysis solutions on each individual slide. Neither of these approaches are cost-effective, as pathologist time is one of the most costly in tissue diagnostics.

It would therefore be a benefit to provide improved methods for quantitative pathology analysis, whereby efficiency can be maximized by minimizing time spent by pathologists toward annotating multiple slides. Furthermore, it would be a significant advancement in the art if methods were developed for rapidly aligning and annotating regions of interest across several like samples, such as across multiple consecutive sections of biological tissue. In addition, it would be beneficial to provide methods for differential staining of adjacent tissue cross-sections, such that a plurality of scores across a multitude of inquiries may be obtained. Further benefits would include an ability to analyze adjacent cross-sections of tissue for a plurality of concerns, and to produce a hybrid score such that overall diagnosis and quantification can be improved. These methods may be embodied within one or more algorithms to be programmed in an image analysis system.

SUMMARY OF THE INVENTION

The following specification discloses improved methods for quantitative pathology analysis, including aligning consecutive tissue cross-sections and transferring regions of interest (ROIs) from one tissue section of a reference slide, to a target slide containing an adjacent tissue cross-section using computer software tied to an imaging system. The regions of interest need only to be outlined on the reference slide, either manually or with digital tissue analysis. Additionally, whole slide digital images of tissue sections being cut closely, and ideally sequentially, will be aligned above and below the reference slides, allowing the regions of interest to be transferred to these target slides.

This invention allows multiple biomarkers to be measured, or more accurate features to be identified, with only the reference slide requiring annotation of regions of interest, thereby reducing time required by a pathologist for tedious annotation of multiple slides. It is an important improvement in quantitative histopathology assessments, especially in both cancer research and toxicologic pathology, although not limited to these areas.

BRIEF DESCRIPTION OF THE DRAWINGS

These and other features can be further understood upon a thorough review of the descriptions, and particularly when viewed in conjunction with the appended drawings, wherein.

DETAILED DESCRIPTION

Figure 1:
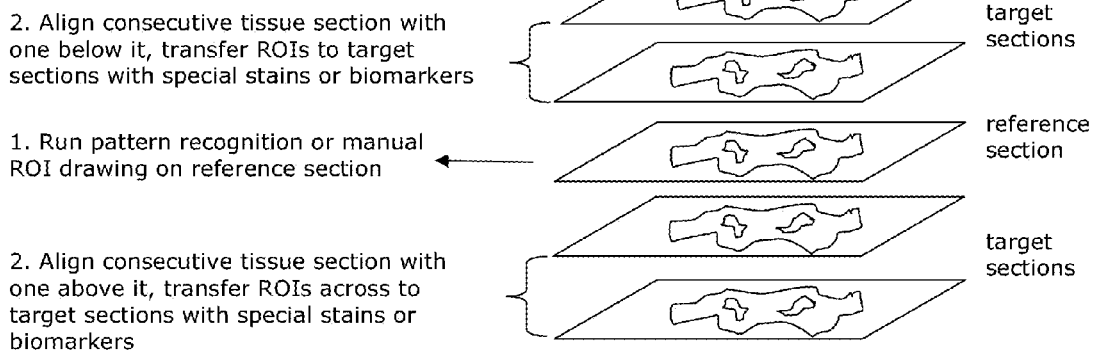
FIG. 1 illustrates multiple a general concept of the methods for feature analysis on consecutive tissue sections (FACTS) as disclosed herein.

In the following description, for purposes of explanation and not limitation, details and descriptions are set forth in order to provide a thorough understanding of the embodiments of the invention. However, it will be apparent to those skilled in the art that the present invention may be practiced in other embodiments that depart from these details and descriptions.

In various embodiments of the invention, the above problems and limitations have been overcome with the use of a technique herein referred to as "Feature Analysis on Consecutive Tissue Sections", or FACTS.

In a general embodiment of the invention, a method for feature analysis on consecutive tissue sections is provided, wherein a tissue block is sectioned into thin adjacent, cross-sections. Ideally, the adjacent cross sections are maintained in consecutive order, however it is possible to non-consecutive but relatively nearby "local" sections. Each of the cross sections is prepared on a microscope slide or similar slide. A reference slide is selected from the middle of 3 to n slides, such that any integer between 1 to (n−1)/2 slides may be positioned above and below the reference slide. The slides are individually stained with one or more biomarkers, dyes, or similar stains. A digital image is taken of each of the reference slide, and adjacent stained slides for analysis. A pathologist annotates one or more regions of interest within the reference slide either manually or digitally. The tissue sections of each of the adjacent slides are individually aligned with the reference slide, and the region of interest (ROI) from the reference slide is transferred to each adjacent slide. In this regard, the pathologist need only annotate a single reference slide and transfer said annotations to the adjacent slides after aligning the slides. With the regions of interest now transferred to each slide, a multitude of analytical tasks can be performed for yielding quantitative scores. Thereafter, each of the scores may further be utilized by one or more of the methods of this invention to produce a combinative score. Although a single reference slide has been discussed, it is possible to include several reference slides between consecutive tissue sections. Specific details and examples are further described below.

FACTS methods begin with histology and slide preparation. Thin consecutive sections are cut from a tissue block at standard tissue thicknesses; e.g. for paraffin, 4-5 microns, and for plastic, 2-3 microns. Epoxy blocks can be used optionally to obtain sections even closer, although 4 microns works adequately well in most samples. Any number of sections can be used, provided the sections can be optimally aligned computationally. A central section is used as a reference slide, and the pathologist will annotate regions of interest or run tissue analysis on this reference slide. A stain can be used that is optimum for pathologist viewing, such as Hematoxylin and Eosin (H&E) stain. Alternatively, a stain can be used that is optimized for assisting with tissue analysis, for example, a stain to identify specific cell types like tumor cells, or stroma cells. Each of the other sections, also herein referred to as target slides can have special stains or immunohistochemistry applied such that a specific feature or biomarker can be measured per slide. Once regions of interest are identified on the reference slide, either by manual annotation or tissue analysis, these regions are then transferred to the sections above and below the reference section by aligning the slides. Alignment of slides can be done as outlined by numerous well-known image registration approaches as mentioned previously.

One aspect that can be very challenging using previously described image registration and alignment techniques is the differences in staining between the reference slides and the target slides. One approach is to utilize digital color deconvolution to computationally deconvolve each slide into its histological staining types using linear algebra transformation (Ruifrock and Johnson (2001) 23(4):291-299). Then, the images can be registered and aligned using only the concolved stains that are in common between the images. This could be hemotoxylin in aligning H&E slides with immunohistochemistry (IHC) slides, or 4',6-diamidino-2-phenylindole (DAPI) in fluorescence, or other stains commonly used.

After regions of interest have been transferred from the reference to the target slides, and aligned properly on the areas of interest, scores can be computed on these regions based on any number of approaches for scoring on single slides. These include area scoring, object scoring, or cell scoring. In cell-based scoring, any approach used in the industry can be implemented, such as automated H scoring, image analysis guidelines, i.e. ER/PR and HER2 measurements in breast cancer, etc. Once a score has been computed on each slide, another aspect of this invention is possible.

The scores can then be combined back into a single score, using any number of multivariate statistical approaches. These can include self-organizing maps, support vector machines, artificial neural networks, linear discriminate analysis, decision trees, or other techniques where multiple variables are combined into a single continuous or discrete score.

For example, in current clinical practice, breast cancer staging for Herceptin and other related therapeutics is a two stage decision tree, with three biomarkers utilized in staging; such as positivity for Estrogen receptor (ER), Progesterone Receptor (PR) and HER2 antigens is one outcome. With new therapeutics emerging, interest is increasing in combining multiple IHC or in situ hybridization (ISH) scores into a single score, similar to the approaches taken by gene expression profiling devices for breast cancer recurrence as classified under 21 CFR 866.6040

FIG. 1 illustrates digital images of five consecutive tissue sections obtained from a tissue specimen, the consecutive tissue sections are each stained with at least one biomarker. A middle of the consecutive tissue sections, i.e. a "reference section", is annotated by a pathologist to identify one or more regions of interest. Images of adjacent tissue sections are registered with the reference section for alignment and the one or more regions of interest are transferred to the adjacent sections thus reducing the amount of annotation required for the analysis. Each of the images is then scored according to various techniques.

Figure 2:
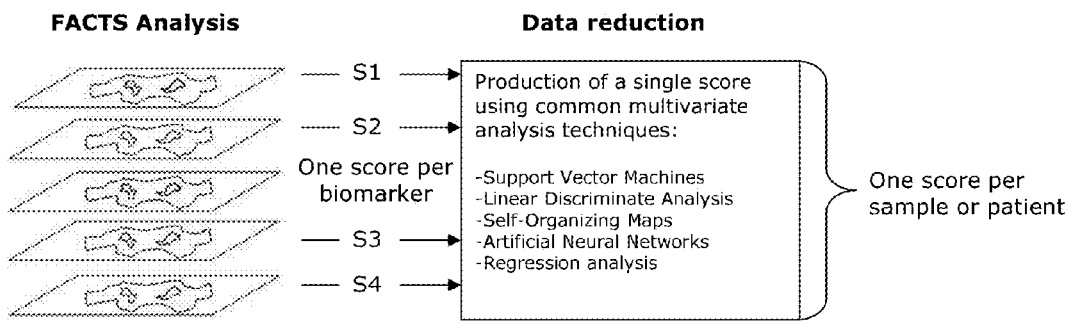
FIG. 2 illustrates a general concept of multiplexing biomarker measurements after FACTS.

FIG. 2 illustrates the preparation, staining, alignment, and annotation using FACTS methods as described above, as well as a concept for obtaining a plurality of scores for each biomarker and combining the scores to obtain a single sample score.

Variations

Sometimes it is not possible for a single standard, special or IHC stain to adequately identify the regions of interest in the reference sample. In this case a second reference sample can be used. The computer analysis can then be run on each section independently and the ROIs combined, or the images can be combined digitally prior to tissue analysis to identify ROIs. Several examples of will be further described herein below.

For multiplexing a larger number of biomarkers, it may be desirable to space multiple reference sections out in the tissue, with target sections in between. Another alternative is to transfer ROIs from the central reference section to the consecutive target section on either side, then transfer these ROIs to the next consecutive target section, in a stair-hopping image registration approach.

In other areas of biology, for example in real-time polymerase chain reaction (PCR), it is common to report gene expression as a ratio to one or more "housekeeping" genes. These are genes that are known to be relatively stable, and thus the gene of interest can be reported not as an absolute value but as a ratio to one or more of these housekeeping genes. The same approach can be utilized in combination with the disclosed FACTS methods. For example, one or more of the features (e.g. genes, proteins) in the reference or target sections are used as housekeeping features, and the other biomarkers are reported as a ratio to the expression level of these housekeeping features. The housekeeping features can be used individually, or in combination by averaging, or other simple approaches to combining their expression levels. By providing a ratio of biomarker expression to a housekeeping feature, a score for each biomarker will include calibration for variability in the tissue processing steps that are part of immunohistochemistry, or immunofluorescence.

In certain embodiments, significant advantages may be achieved in immunofluorescence combined with brightfield immunohistochemistry. The slides can all be brightfield, all fluorescent, or a combination of each.

Applications

Certain examples are now described for the purpose of illustrating inventive features to one having skill in the art, however these examples are not exhaustive and are therefore not intended to limit the spirit and scope of the invention as set forth in the appended claims. In certain embodiments, markers from any application below could be combined usefully with others from a different application. Any tissue study where multiple proteins or mRNA require measurement is a suitable application for multiplexed analysis. In preclinical toxicologic pathology, any application where a stain can be used to help elucidate a toxicological response is also a suitable application for FACTS methods.

Hormone Receptor Prognosis in Breast Cancer

A common use of IHC in oncology is with sub-typing of breast tumors to determine therapeutic application. Common practice in automated image analysis and quantitation of biomarkers is for pathologists to draw a region of interest in each of the IHC slides to be analyzed. This is a tedious task, required regions of interest on three biomarkers (ER,PR, HER2) prior to analysis by the automation program. In addition, the pathologist can bias the results by inadvertently focusing too much or too little on specific (e.g darkly stained) regions of the slide.

In one embodiment of the invention, the pathologist identifies one or more regions, or trains the computer to identify regions, on a reference section that does not contain any biomarker information (e.g. an H&E slide). One or more adjacent sections, or target slides, are digitally aligned with the reference slide. The identified regions are then transferred to the biomarker target sections, and data is generated for determining a score according to industry standards.

This approach will save pathologist time, as well as eliminate a potential source of bias by the pathologist. Additionally, this approach can be combined with any number of specialty stained slides as mentioned above. With new biological therapeutics against new targets, this will be particularly useful in combining the expression of the new target markers with existing well-established markers.

Tumor Identification from Non-Tumor Tissue

A common analytical problem in tumor pathology is to identify biomarker expression on only tumor regions, excluding other tissue types (e.g. stroma, vessels) and necrotic areas. A number of approaches have been attempted which utilize tissue analysis to identify only appropriate tumor tissue. Generally the variability is too high for this approach to work well in clinical practice.

Figure 3:
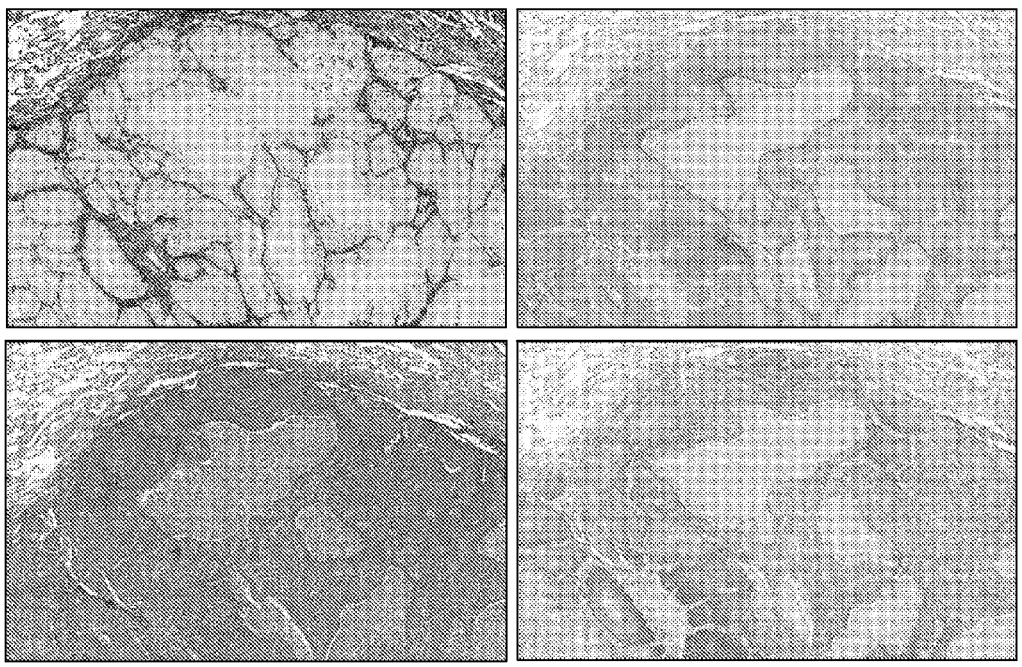
FIG. 3 illustrates four images representing four consecutive tissue sections of a tumor, each of the tissue sections is stained with a distinct biomarker according to embodiments of the invention.
Figure 4:
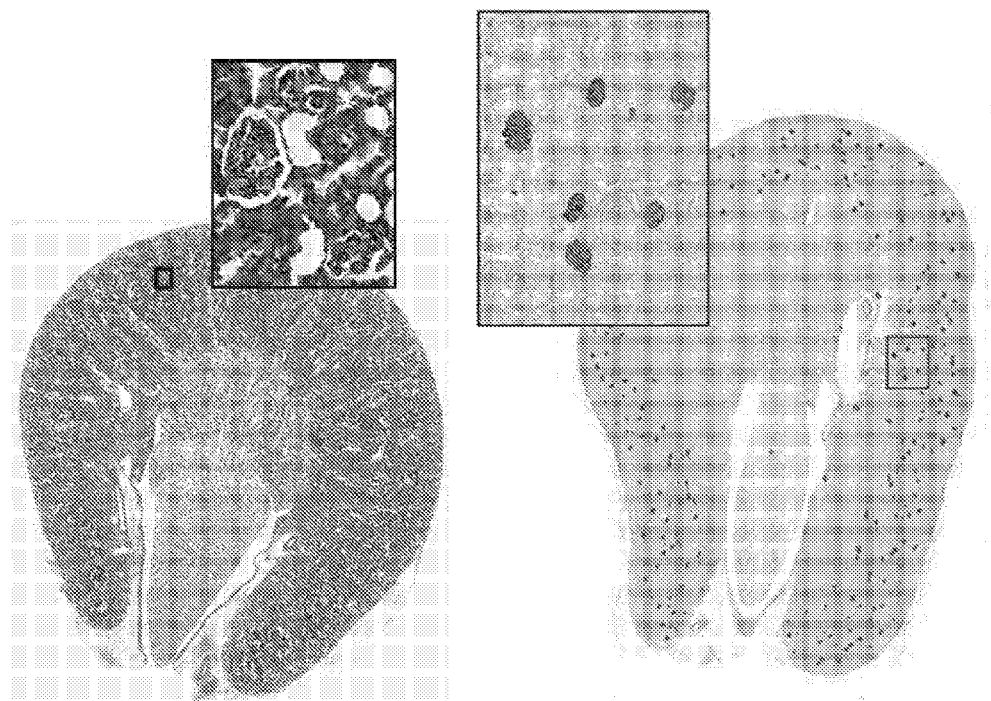
FIG. 4 illustrates two digital images of kidney tissues for use with FACTS methods, each of the tissues was stained with a unique biomarker for illustrating that certain biomarkers are better suited for digital quantification techniques; i.e. counting pixels.

FIG. 3 illustrates four digital images, each of consecutive tissue sections of a tumor containing tissue. Because it is difficult to distinguish tumor from stromal or connective tissue and quantify the tumor regions with a single biomarker, multiple slide images and stains are used. A first image is of a tissue section that is stained with a biomarker appropriate for identifying epithelial tissue. A second image is of a tissue section that is stained with a biomarker appropriate for identifying mesenchymal tissue. A third image is of a tissue section that is stained with a standard H&E. A fourth image is of a tissue section that is stained with a biomarker suitable for quantitative analysis of the tumor region, in this case epidermal growth factor receptor (EGFR).

In an embodiment of the invention, a reference slide is provided with a stain or antibody specific to the tissue types (e.g cancer cells, vessels, stroma). As in the above embodiments, one or more regions of interest are annotated by a pathologist on the reference slide, and the regions of interest are digitally transferred to one or more adjacent tissue sections by way of aligned target slides. More than one reference slide may be required. For example, for tumors of epithelial origin (e.g. colorectal cancer), a stain for mesenchymal cells will delineate the stroma or non-tumor region, allowing differentiation from the epithelial tumor tissue. Identifying tumor area is useful not only in selecting regions of interest for biomarker expression, but also as a variable by itself (e.g. the percent tumor in a tissue section). It may be desirable to also identify necrotic regions by using these or similar stains.

Identification of Specific Tissue Regions

It is common to measure specific areas within tissue sections, either for exclusion or inclusion as an area for biomarker analysis, or as a variable by itself. This is normally done either by a pathologist manually delineating specific areas on an H&E or an IHC slide, or running tissue analysis on a single slide.

However, in another embodiment of the invention, a slide that has been stained to identify specific regions of tissue can be used as a reference slide. For example, TUNEL stains identify dead cells and do not discriminate between necrosis and apoptosis, and thus could be used as the reference slide. A reference slide stained for necrosis could be combined with slides stained for tumor versus stroma as identified above, and all combined to give a single ROI that could then be applied to the target slides as described above.

Characterization of Inflammatory or Immune Cells in Tissue

Analysis of immune response is an important indication in oncology and other areas of pathology. Tumors with strong inflammatory response generally have much poorer prognosis. Inflammatory cells often require multiple biomarkers for identification, making them an excellent application for the present methods. In flow cytometry, multiple CD markers are used to classify immune cells, and the same approaches can be applied in tissue. Macrophage cells can be subclassed using known macrophage classification markers like CD45 or CD68. A panel of standard markers like CD3, CD4, CD8 and class II antigens of the major histocompatibility complex (MHC) can be analyzed using the present methods as described above to classify immunological response to tumors or other disease prognosis.

Cell Proliferation Markers

Cell proliferation is a known important indication that can determine outcome in oncology. Single proliferation markers like Ki67 are frequently used. In another embodiment of the invention, a panel of proliferation markers including but not limited to Ki67, PCNAs, cyclins, P16, P21, AgNORs can be used to judge proliferation in more detail. The regions of interest are determined first to eliminate necrosis and stroma as discussed above. Cell proliferation markers may be combined with any other measurement type (e.g. necrosis, tubulin measurement, infiltrating cells, subcellular localization, etc.).

Panel Prognosis with Tubulins

Microtubules are involved in cell growth and division, motility, and the development and maintenance of cell shape. Disruption of normal microtubule formation and function can be implicated in tumor development. Numerous studies have investigated the role of alpha- and beta-tublin expression and formation in prognosis of various cancer types. There are many known subtypes and isoforms of microtubules, including α-tubulin (TUBA1A, TUBA1B, TUBA1C, TUBA3C, TUBA3D, TUBA3E, TUBA4A, TUBA8), β-tubulin (TUBB, TUBB1, TUBB2A, TUBB2B, TUBB2C, TUBB3, TUBB4, TUBB4Q, TUBB6), γ-tubulin (TUBG1, TUBG2, TUBGCP2, TUBGCP3, TUBGCP4, TUBGCP5, TUBGCP6) δ-tublin (TUBD1) and ε tubulin (TUBE1).

Using the above described methods for feature analysis across consecutive tissue sections, antibodies for isoforms of microtubules can be utilized separately or in combination to better characterize a disease state. This approach is particularly useful in the development of a companion diagnostic in combination with a therapeutic targeting a microtubule development pathway. Anticancer drugs include Taxol, vinblastine, and vincristine. Other non-cancer drugs targeting tublines with applications for these methods include the anti-gout agent colchicines, and the anti-fungal Griseofulvin.

Epigenetics Markers

Differences in cellular levels of histone modifications have predicted clinical outcome in certain cancers, including pancreatic adenocarcinoma (Manuyakorn, Cellular histone modification patterns predict prognosis and treatment response in resectable pancreatic adenocarcinoma: results from RTOG 9704. (2010) J Clin Oncol. 2010 Mar. 10; 28(8): 1358-65). To be effective, Histone profiling requires measuring a number of Histone markers (e.g. histone H3 lysine 4 dimethylation (H3K4me2), histone H3 lysine 9 dimethylation (H3K9me2), and histone H3 lysine 18 acetylation (H3K18ac), for example). These measurements could be multiplexed and either measured directly or utilized as ratios of housekeeping proteins according to the above-described FACTS methods. Intratumoral heterogeneity of histone expression could also be investigated as an additional marker.

Stem Cell Markers

In the emerging area of stem cell analysis, the multiplexing capability of the above described methods for feature analysis on consecutive tissue sections can be applied. There are a large number of stem cell markers that can be multiplexed for useful applications. A non-exhaustive list is references at stemcells.nih.gov.

Panel Prognosis with Transcription Factors

Transcription factors are another area where multiplexing with the above described FACTS methods may prove to be useful. Many of the most useful differentiators of tumor types and natural tissue types are transcription factors and these can be combined with FACTS methods for multiplexing into a useful prognostic.

Sub-Tissue Localization

Using the above-describe methods for feature analysis on consecutive tissue sections, the computer is no longer limited to the stains available on one slide, but rather can utilize a combination of organelle or sub-tissue type stains for more accurate isolation. For example, in kidney research it is often important to identify protein expression and cellular health in glomeruli, a region that is easy to see with the trained eye, but very difficult to consistently identify with tissue analysis. A stain for kidney glomeruli (e.g. WT1, CD54, Congo Red, anti-Nestin, anti-GBM, anticollagen, antiactomyosin, IgG, IgM, C3, Silver stain, PAS, etc.) can be used to automatically find glomeruli regions, followed by a stain specific for glomeruli abnormalities or damage. In another example, in diabetes research it is important to obtain a measurement of alpha and beta cell mass in pancreatic islets. A stain for islet cells on a reference slide can be followed with stains for islet abnormalities or alpha and beta cells.

Without special stains, identification of glomeruli in the kidney is an extremely difficult image analysis problem in normal kidneys as illustrated in the left image, and nearly impossible in diseased kidneys. With a special stain for glomeruli as illustrated in the right image, the problem is trivial for image analysis to consistently recognize glomeruli, and then transfer these regions of interest to aligned sections using FACTS methods.

Tumor Heterogeneity Measurements

Tumors are not homogeneous across a tissue section, and this has been a frequent difficulty in scoring in breast and other tissue. Pathologists will take an average expression across a slide, and historically have not utilized the degree of heterogeneity as a score in and of itself. Recent ASCO/CAP Panel Summary and Update on HER2 Testing Guidelines noted the incidence of intratumor heterogeneity ranged in the literature from 5 to 30%, and that the presence of HER2 genetic heterogeneity may increase subjectivity in HER2 interpretation by a pathologist (Vance et al, Arch Pathol Lab Med (2009) 133:611-612). Marked heterogeneity has long been observed in gastic carcinoma. The use of aligned whole slide images has two advantages related to tumor heterogeneity. First, utilizing a larger area of the slide by eliminating manual drawing allows for a larger sample size. Second, using sampling principles well-known in the Stereology field, one can measure a biomarker's heterogeneity across the slide and compare it with other markers as a prognostic indictor by itself or in combination with other markers or heterogeneity scores. One could sample a set of regions on a slide, after utilizing this invention to define the regions in the appropriate tissue, and then obtain a percent heterogeneity score. This could be repeated for each biomarker. One could use the housekeeping protein approach mentioned previously to standardize the expression of each protein prior to measuring heterogeneity.

Toxicology

In toxicologic pathology, a manual microscopic review of tissue is conducted by a pathologist to determine abnormal responses. Numerous image analysis approaches to automating the identification of lesions of standard H&E stained preclinical sections have not been successful. While image analysis procedures and automated algorithms have not been well established for differential diagnoses of tissue changes, the above-described methods for feature analysis on consecutive tissue sections will have applications for refining and quantifying changes that are identified by a pathologist evaluation. For example, tissue fibrosis is a pathological disease process that can effect multiple tissues; and while easily recognized by a trained pathologist, is not easily quantified by standard histologic straining (e.g H&E). Special staining can differentiate fibrosis for quantification and the above-described methods for feature analysis of consecutive tissue sections can be used to identify regions to be analyzed. FACTS can be utilized for a number of applications to differentiate tissue sub-regions for subsequent specialized analysis. In lung, specific stains in one or more reference slides could be used for smooth muscle, collagen, bronchioles, or goblet cells. In liver, stains for ducts could be utilized to better differentiate localization of various liver toxicologies. In kidney, glomeruli or specific tubule stains (e.g. proximal and distal) could be utilized. In the pancreas, stains for alpha, beta, ducts, or acinar tissue could be utilized. In muscle, stains for type I and type II fibers, or stains like laminin or myosin ATPase could be utilized. In various vascular measurements, stains for smooth muscle and endothelial cells could be utilized for biomarker expression in endothelial or pericytes. In joints and bone, stains for osteoclasts, osteoblasts, and vascularization could be utilized in aligned sections.

Medical Devices and Biocompatibility

The assessment of the local tissue response to an implanted device is an important contribution of pathology to implanted medical device development. The evaluation of biocompatibility and local tissue response is a largely qualitative analysis, conducted by a pathologist under a microscope, looking for a large number of abnormal pathological responses.

Using the above-described methods for feature analysis of consecutive tissue sections, stains can be used that help to either identify a particular response or identify a given sub-tissue. Some of the biocompatibility features that are typically identified manually and scored have been outlined by Schuh CL (Medical Device Regulations and Testing for Toxicologic Pathologists, Toxicol Pathol 2008 36: 63).

TABLE 1

| Feature to be identified and measured | Possible staining approaches with FACTS |
|---|---|
| Inflammation polymorphonuclear | CD45, various polynuclear leukocyte markers |
| Plasma cells | CD138 or other anti-plasma cell antibodies |
| Macrophages | anti-CD11b, CD14, CD68, anti-macrophage mAb 3A5 |
| Giant cells | CD68 with image analysis |
| necrosis | TUNEL, CASPASE, Annexin V |
| Fibrosis | Masson's trichrome, Sirius red |

Table 1 illustrates these along with a non-comprehensive list of stains or antibodies that could be applied for automatically identifying and quantitating these on consecutive tissue sections using FACTS.

In stent and artery cross-sections, one could use a set of stains for better differentiation of restenosis or other lesions.

Bridge Staining and Multimodal Scanning

In another aspect of the invention, multiple modes of scanning can be combined using FACTS methods, such as a combination of brightfield whole slide scanning with fluorescence whole slide scanning.

In one embodiment, a brightfield scan can be combined with an auto-fluorescent scan to identify biomaterials with strong fluorescent properties; or alternatively to identify the arterial structure in the fluorescence of the tunica intima. The images can be aligned according to FACTS methods as described above.

Many implanted materials fluorescence, allowing for identification of the biomaterial. Consecutive sectioning can then be implemented to provide a plurality of slides, each of these slides representing a distinct biological phenomena which can be measured in accordance with FACTS methods; i.e. with stains or pattern recognition as is described above. This includes angiogenesis, extracellular matrix changes such as fibrous capsule, and infiltrating immune cells among others.

In another embodiment, immunostained fluorescence slides are scanned; for example having multiple fluorochromes bound to an antibody of interest. Upon completion of the fluorescent scan, the slide can be stained with brightfield dyes and processed for brightfield scanning. The resulting images can be overlaid and analyzed in accordance with FACTS methods.

In yet another embodiment, a practitioner may run an immunofluorescent stain, and a brightfield stain, followed by an immunofluorescent scan and a brightfield scan. For example, immunofluorescent dyes with FITC and TRITC and cherry red can be combined with a brightfield nuclear stain like hemotoxylin or a trichrome stain of a PAS stain.

In the clinical workflow, it is common to look at FISH analysis under 40× or 60× fluorescent microscopy. However, it is difficult to visualize the boundaries of the cells under fluorescence. It is also typically not feasible to scan the entire slide at this magnification; it takes far too long with current scanning technology. Instead, smaller section scans can be obtained or microscope photographs at this resolution in fluorescence, and these scans can be aligned with an entire brightfield slide scanned at 20× or 40×. In this regard, the pathologist can visualize the entire slide in brightfield, and then conduct FISH analysis on only smaller regions aligned against the brightfield slide. Image analysis can be combined in this way, where protein expression is measured in brightfield (e.g. HER2, ER or PR in breast cancer, on single or aligned brightfield slides) and FISH is measured with fluorescence. One could also use a slide in either brightfield or fluorescence to help distinguish tumor from stroma (e.g. with an endothelial or mesenchymal stain or other staining approach).

Tumor Heterogeneity Measurement

In another aspect of the invention, a method for measuring the degree of tumor heterogeneity in a tissue sample is provided. Tumors evolve under pressure from multiple sources, including treatment regimens, immune response, and genetics. Tumors are not homogeneous, but have substantially different signatures in different sections of an organ. Most pathology scoring systems have treated scoring as a composite signature across the sample. This ignores the degree of heterogeneity in a tumor. There is growing evidence that tumor heterogeneity may be an important indication of prognosis in a tumor. Several approaches to measuring tumor heterogeneity are herein described as a useful prognostic indicator.

Tumor heterogeneity is a difficult problem, and can be described in at least three forms, including: tumor-level heterogeneity, cell-level heterogeneity, and anatomic heterogeneity Regarding the first form, tumor-level heterogeneity may include the differential expression of biomarkers across a section of a slide, and may indicate the degree to which different tumor populations have become homogeneous over time across an organ. Automated feature recognition is always run first to eliminate non-neoplastic regions from statistical analysis. Poor sample handling or IHC procedures can be identified. The oncologist has a means of understanding the variability of a given score by a pathologist, or an unusual patient tumor expression pattern.

Regarding the second form, cell-level heterogeneity may include the differential expression of a marker from cell-to-cell in neoplastic regions. High levels of cell-level homogeneity may indicate more evolved tumor samples.

Anatomic heterogeneity includes the differential expression of a marker in different anatomic regions of a tumor. In breast, an IHC marker might preferentially express in lobules, ducts, cycts, or lobular hyperplasias for example. Anatomic heterogeneity is very difficult to quantify, and will likely continue to rely on a descriptive classification scheme by a pathologist.

There are a number of challenges associated with tumor heterogeneity. Here, we seek to utilize the degree of heterogeneity as a biomarker in itself, whether this is tumor-level, cell-level, or anatomic heterogeneity.

In each of these methods, the tumor is differentiated from the stroma by a pattern recognition approach, or the use of FACTS methods, or a manual drawing of tumor. If a programming approach is used to automatically sample or divide up the tumor, heterogeneity can be lost while doing this automated subdividing or sampling. If however, the pathologist draws clumps of tumors, and uses these as the sampling unit, then there is bias in which clumps a pathologist chooses to utilize. The best approach would combine the ability to choose biologically meaningful sampling areas (e.g. clumps or islands of distinct tumor) with the ability to do this without biased sampling.

In an embodiment of the present invention, tumor cells are identified and differentiated from stroma using techniques already common in the industry with automated feature recognition or implementation of FACTS methods or manual drawing. Once the tumor region on a slide has been identified, the tumor regions are sectioned into a number of samples, using a computer program to divide these regions.

The biomarker signature to be measured is scored with automated image analysis scoring (e.g. H scores or similar) or with manual pathologist scoring. The standard deviation and coefficients of variation is reported as an IHC heterogeneity score for these regions as shown in Table 2 below and the variation as well as the IHC score for each biomarker is utilized as a variable to determine prognostic significance in outcome. The biomarker scores and heterogeneity scores can be combined into a composite score as is often done with multiple IHC scores.

TABLE 2

| Patient | HER2 Score | Heterogeneity HER2 Score |
|---------|------------|--------------------------|
| A | 2 | +/−0.9 |
| B | 2 | +/−0.2 |
| C | 1 | +/−0.2 |
| D | 3 | +/−0.2 |

In the example above, while patient A and patient B both have similar IHC scores for this biomarker, they are quite different in their tumor heterogeneity score, with patient A having very high heterogeneity and patient B having much lower heterogeneity. This is useful information that could be prognostic for disease outcome.

In the industry, H scoring or some variant is common, which is reported as the number of multiple levels of IHC stained cells (e.g. 21 0+ cells, 123 1+ cells, 381 2+ cells, and 120 3+ cells). These numbers are then combined into a single score. While the H scoring or its variants will give information on the distribution of cells with a given expression, it does not give any information on the heterogeneity of this distribution across a section of cells or an entire tumor.

Anatomic heterogeneity can be measured using a descriptive approach, where tissues are labeled based on their tumor and staining profiles in different anatomic areas (e.g. strong straining in ducts, weak staining in glands, etc.).

Angiogenesis Measurement

Most approaches to angiogenesis start with the identification of vessels, typically with the assistance of a special stain like CD31. The vessels are identified using image analysis, and the microvessel density is reported. This approach can be problematic when the vessels are not discrete objects, but rather a network of tangled vascular structures. In these cases, typically the best measurement that can be made is an area measurement of endothelial positive tissue.

In an embodiment of the invention, on may use the approach referred to as "Oxygenated Tissue Analysis" (OTA). Rather than measure vascularity by counting the number or area of vessels, the degree of oxygenation of the tissue is estimated. With this approach we are concerned less with the vessels themselves and more with the distance that the tissue is from these vessels. Generally this approach involves the following steps:
1) Finding the target tissue (e.g. tumor), using the above-described FACTS methods;

2) Identifying the vascular structures. One does not need to individually identify vessels, but find endothelial positive tissue and their associated structures 3) Determining the percentage of target tissue that is within a given distance of these vessels.

Each of these steps can be broken down in further detail, with a number of variations 1) Finding Target Tissue.

In tumor examples with angiogenesis, the target tissue can be found by FACTS techniques, where a differential staining technique for tumor, stroma or necrosis can be utilized. In examples such as bone marrow (e.g. in predicting OTA in AML patients as a more clinically measurable prognostic indicator than microvessel density) target tissue will require differentiating hematopoeitic tissue from bone and fat vacuoles, which can be done reliable with histology pattern recognition. In ophthalmology, OTA will require the identification of a single cell retina layer, using pattern recognition (e.g. for a useful measurement of acute macular degeneration, it is important to quantify neovascularizaiton on the outermost surface of the retina).

2) Identifying the Vascular Structures.

In one embodiment, endothelial cells are identified using an endothelial stain and color deconvolution and thresholding of the endothelial channel. Then image analysis is use to form these endothelial cells into vessels. Vessel locations are then identified.

3) Percentage of Target Tissue within a Given Distance of Vessels.

This step will have multiple variations depending on the example of interest. The software program will allow the user to enter a number of contours and a given distance for each contour from vessels as shown below. The program will then compute the percentage of tissue that is within each contour. The results can be given as these raw percentages, or combined into a score.

| Contour | Distance from vessels |
|---------|----------------------|
| 1 | 10 microns |
| 2 | 20 microns |
| 3 | 30 microns |
| 4 | 45 microns |

Alternative Embodiments

Lymph Vessels

One could also use this approach to look at lymphatic vessels, either alone or in combination with blood vessels. This would require a stain for lymph vessels, either by itself or with a stain for endothelial lined blood vessels.

Radiology

In radiology, it is not common to see 2D or 3D representations of vascularity as a large network of vessels. Quantification of these vessels is difficult. OTA could be used to provide a reliable measure in many situations involved vascularity measurements with various radiology modalities, including but not limited to X-ray, microCT, CT, MRI etc.

We claim:

1. A method for feature analysis on consecutive tissue sections, comprising:
obtaining a tissue specimen for analysis;
sectioning said tissue specimen into at least three consecutive tissue sections comprising a first tissue section, a second tissue section, and a third tissue section, said second tissue section originating from a volume of said tissue specimen between said first and third tissue sections;
applying at least a first biomarker to the first tissue section of said consecutive tissue sections, applying at least a second biomarker to the second tissue section, and applying at least a third biomarker to the third tissue section;
using a digital image analysis system comprising a camera and a display screen to capture at least a first digital image of the first tissue section, a second digital image of the second tissue section and a third digital image of the third tissue section; and
registering the digital images of the first and third tissue sections with the digital image of said second tissue section to digitally align each of the images;
characterized in that the method further comprises:
annotating one or more regions of interest within the second digital image of the second tissue section;
transferring said one or more annotated regions of interest from the second digital image to at least one of the first and third digital images that are digitally aligned therewith; and
deriving a tissue analysis score for each of said consecutive tissue sections.

2. The method of claim 1, wherein said obtaining a tissue specimen comprises preparing a tissue sample in a paraffin block and thinly slicing each of said consecutive tissue sections therefrom.

3. The method of claim 1, wherein said at least three consecutive tissue sections comprises five consecutive tissue sections.

4. The method of claim 1, wherein said first through third biomarkers are each distinct from one another.

5. The method of claim 1, wherein said deriving a tissue analysis score comprises executing an algorithm programmed within said digital analysis system to quantify one or more pixilated areas within the annotated region of interest from at least one of said digital images.

6. The method of claim 1, wherein said annotating one or more regions of interest comprises at least one of: selecting one or more cells or groups of cells having a specific cell type.

7. The method of claim 1, wherein said annotating one or more regions of interest comprises at least one of: selecting one or more cells or groups of cells having a specific antibody marker or stain.

8. The method of claim 1, wherein said deriving a tissue analysis score comprises:
with the regions of interest being transferred from the second digital image to each of the first and third digital images,
scoring said first digital image at said regions of interest to determine a first score associated with a first protein; and
scoring said third digital image at said regions of interest to determine a second score associated with a second protein;
said first and second proteins being distinct from one another.

9. The method of claim 8, wherein each of said first and second scores comprise an immunohistochemistry (IHC) score.

10. The method of claim 8, further comprising combining at least said first score and said second score to report a combined score.

11. The method of claim 1, wherein said second tissue section is stained with an antibody for endothelial tissue such that said regions of interest of the second digital image correspond to vascularity of the second tissue section; wherein said regions of interest of the second digital image are transferred to said first and third aligned digital images, respectively; said first tissue section being stained to identify one or more first cells, and said third tissue section being stained to identify one or more second cells, said first and second cells being distinct from one another, and deriving a score representative of the percentage of first and second cells that are within a given range of the vasculature.

12. The method of claim 1, wherein the second tissue section comprises a section of tissue about an implanted medical device; the second tissue section is stained with hematoxylin and eosin; at least one of the first and second tissue sections is stained with an antibody or marker associated with one of: inflammation, plasma cells, macrophages, necrosis, or fibrosis; the second digital image corresponding to the second tissue section is annotated to identify the regions of interest about portions of the implanted medical device within the second tissue section; said regions of interest are transferred to the first and third digital images corresponding to the first and third tissue sections; wherein said deriving a tissue analysis score for each of said consecutive tissue sections comprises quantifying inflammation within the regions of interest of the first and third digital images.

13. The method of claim 1, wherein said regions of interest of the second digital image are transferred to said first and third aligned digital images, respectively; said first tissue section being stained to identify one or more first cells, and said third tissue section being stained to identify one or more second cells, said first and second cells being distinct from one another, and deriving a score representative of the percentage of first and second cells.

* * * * *